US012603005B2

(12) United States Patent
Pasquet et al.

(10) Patent No.: US 12,603,005 B2
(45) Date of Patent: Apr. 14, 2026

(54) DRIVER ASSISTANCE MODULE FOR A MOTOR VEHICLE

(71) Applicant: Continental Automotive Technologies GmbH, Hannover (DE)

(72) Inventors: Emmanuel Pasquet, Toulouse (FR); Mohamed Cheikh, Toulouse (FR); Sébastien Kessler, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 185 days.

(21) Appl. No.: 18/034,205

(22) PCT Filed: Sep. 28, 2021

(86) PCT No.: PCT/EP2021/076666
§ 371 (c)(1),
(2) Date: Apr. 27, 2023

(87) PCT Pub. No.: WO2022/096196
PCT Pub. Date: May 12, 2022

(65) Prior Publication Data
US 2023/0410654 A1     Dec. 21, 2023

(30) Foreign Application Priority Data

Nov. 3, 2020     (FR) ...................................... 2011251

(51) Int. Cl.
| | |
|---|---|
| *G08G 1/16* | (2006.01) |
| *H04W 4/02* | (2018.01) |
| *H04W 4/46* | (2018.01) |

(52) U.S. Cl.
CPC .............. *G08G 1/162* (2013.01); *H04W 4/02* (2013.01); *H04W 4/46* (2018.02)

(58) Field of Classification Search
CPC ........... G08G 1/162; H04W 4/02; H04W 4/46
(Continued)

(56) References Cited

U.S. PATENT DOCUMENTS

| | | | | |
|---|---|---|---|---|
| 6,208,859 B1 * | 3/2001 | Halvorson | ......... | H04B 7/18567 |
| | | | | 455/430 |
| 6,272,338 B1 * | 8/2001 | Modzelesky | ...... | H04B 7/18578 |
| | | | | 455/430 |

(Continued)

FOREIGN PATENT DOCUMENTS

| | | |
|---|---|---|
| CN | 101720461 A | 6/2010 |
| CN | 103794072 A | 5/2014 |

(Continued)

OTHER PUBLICATIONS

I. M. Jacobs, A. Salmasi and T. J. Bernard, "The application of a novel two-way mobile satellite communications and vehicle tracking system to the transportation industry," in IEEE Transactions on Vehicular Technology, vol. 40, No. 1, pp. 57-63, Feb. 1991, doi: 10.1109/25.69974. (Year: 1991).*

(Continued)

*Primary Examiner* — Tiffany P Young
*Assistant Examiner* — Merritt E Levy
(74) *Attorney, Agent, or Firm* — Buchanan Ingersoll & Rooney P.C

(57)     ABSTRACT

An electronic control unit for a vehicle. The electronic control unit including a memory region in which is stored a lookup table indicating, depending on a type of alert and on the distance between the vehicle and a traffic event relating to the alert, the need to send a response message to the alert signal. The electronic control unit being configured to: receive an alert signal relating to a traffic event containing the type of alert and the position of the traffic event, receive the predetermined position of the vehicle, determine the (Continued)

distance between the vehicle and the traffic event, determine, based on the lookup table and on the determined distance, whether or not there is a need to send a response message to the alert signal, and dispatch a command signal commanding a response message to be sent.

11 Claims, 3 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 8,423,048 | B2 * | 4/2013 | Morrison ................ | H04L 67/55 |
| | | | | 455/456.3 |
| 10,486,591 | B1 | 11/2019 | Mezaael | |
| 11,450,206 | B1 * | 9/2022 | Fields ..................... | B60T 17/22 |
| 2005/0088318 | A1 * | 4/2005 | Liu ....................... | G08G 1/0965 |
| | | | | 340/995.13 |
| 2005/0099322 | A1 * | 5/2005 | Wainfan ............... | G08G 1/0104 |
| | | | | 340/995.13 |
| 2005/0221759 | A1 * | 10/2005 | Spadafora .............. | G08G 1/093 |
| | | | | 455/39 |
| 2008/0191863 | A1 * | 8/2008 | Boling ................. | G08B 25/007 |
| | | | | 340/521 |
| 2008/0291052 | A1 | 11/2008 | Burns | |
| 2009/0233623 | A1 * | 9/2009 | Johnson ................ | H04W 84/18 |
| | | | | 455/456.3 |
| 2010/0311385 | A1 * | 12/2010 | Hurwitz ............... | G08B 25/016 |
| | | | | 340/665 |
| 2012/0229301 | A1 * | 9/2012 | Goodwin ............... | G08G 1/162 |
| | | | | 340/902 |
| 2013/0099941 | A1 * | 4/2013 | Jana ................. | G08G 1/096716 |
| | | | | 340/905 |
| 2013/0278442 | A1 * | 10/2013 | Rubin ..................... | H04W 4/06 |
| | | | | 340/905 |
| 2014/0118169 | A1 | 5/2014 | Hamberger et al. | |
| 2015/0158495 | A1 | 6/2015 | Duncan et al. | |
| 2016/0080163 | A1 * | 3/2016 | Taylor ................... | H04W 4/024 |
| | | | | 370/312 |
| 2018/0196443 | A1 * | 7/2018 | Bai ........................ | H04W 4/023 |
| 2018/0208196 | A1 | 7/2018 | Kurata | |
| 2020/0135022 | A1 * | 4/2020 | Xu ........................ | G08G 1/0141 |
| 2020/0294385 | A1 * | 9/2020 | Lowe ................... | G08B 25/005 |
| 2020/0342760 | A1 * | 10/2020 | Vassilovski .............. | G05D 1/22 |

FOREIGN PATENT DOCUMENTS

| | | |
|---|---|---|
| CN | 105632243 A | 6/2016 |
| CN | 108322512 A | 7/2018 |
| CN | 111439201 A | 7/2020 |
| CN | 111762197 A | 10/2020 |
| FR | 2860633 A1 | 4/2005 |

OTHER PUBLICATIONS

B. Aslam, P. Wang and C. C. Zou, "Pervasive Internet Access by Vehicles through Satellite Receive-Only Terminals," 2009 Proceedings of 18th International Conference on Computer Communications and Networks, San Francisco, CA, USA, 2009, pp. 1-6 , doi: 10.1109/ICCCN.2009.5235363. (Year: 2009).*

Vegni et al., "Opportunistic Vehicular Networks by Satellite Links for Safety Applications" Proceedings of the Fully Networked Car Wordshop, Mar. 2010, 1 page.

International Search Report and Written Opinion for International Application No. PCT/EP2021/076666, dated Feb. 2, 2022, 8 pages.

International Search Report and Written Opinion for International Application No. PCT/EP2021/076666, dated Feb. 2, 2022, 12 pages (French).

French Search Report for French Application No. 2011251, dated Jun. 29, 2021 with translation, 12 pages.

Office Action (First Office Action) issued Apr. 24, 2025, by the National Intellectual Property Administration, P. R. China in corresponding Chinese Patent Application No. 202180074247.6 and an English translation of the Office Action. (37 pages).

Office Action (Second Office Action) issued Dec. 31, 2025, by the National Intellectual Property Administration, P. R. China in corresponding Chinese Patent Application No. 202180074247.6 and an English translation of the Office Action. (34 pages).

* cited by examiner

DRIVER ASSISTANCE MODULE FOR A MOTOR VEHICLE

CROSS REFERENCE TO RELATED APPLICATIONS

This application is the U.S. National Phase Application of PCT International Application No. PCT/EP2021/076666, filed Sep. 28, 2021, which claims priority to French Patent Application No. 2011251, filed Nov. 3, 2020, the contents of such applications being incorporated by reference herein.

FIELD OF THE INVENTION

The invention relates to the field of vehicles, especially motor vehicles, and more precisely to an alerting system comprising a set of vehicles and a set of satellites.

BACKGROUND OF THE INVENTION

Nowadays, interactive communication systems exist that allow so-called "connected" vehicles to communicate with each other, these systems commonly being called "V2V" systems ("V2V" standing for "vehicle to vehicle"). This type of system allows a vehicle to alert other vehicles of a problem or of a hazard, for example, a vehicle stopped on the side of the road, or a risk of collision between vehicles, emergency braking, road works, etc.

More precisely, a first connected vehicle detects a hazard, and transmits an alert signal, containing at least one piece of information relating to the hazard, to other nearby connected vehicles. The alert signal is especially a radio-frequency signal.

However, the communication time between the dispatch of the signal by the first connected vehicle and receipt by the connected vehicles present nearby the first vehicle may be relatively long, especially because of the so-called "multi-path" phenomenon. Multi-path occurs when a radio-frequency signal propagates from a first point to a second point via a plurality of paths, especially because the signal is reflected by obstacles, such as for example buildings or vehicles.

Moreover, the higher the number of signals emitted by connected vehicles driving nearby one another, the higher the probability of collision between the emitted signals. For example, for 2000 simultaneously emitted signals, the probability of collision is about 0.2%.

Multi-path and the risk of collision attenuate the alert signals and/or cause certain signals to be lost. If a connected vehicle does not receive the alert signal, then the driver of this vehicle will not be warned of the hazard, this potentially representing an additional hazard to the occupants of the connected vehicle, since the driver or the vehicle might be unable to anticipate the hazard.

In order to know which connected vehicles have correctly received the alert signal, the connected vehicles send an acknowledgment following receipt of the alert signal to provide notification that they have correctly received the alert signal and therefore, the at least one piece of information relating to the hazard.

However, should each connected vehicle send one acknowledgment, the risk of collisions would also be increased, especially between acknowledgments, or with the alert signals.

Therefore, there is a need for a solution allowing these drawbacks to be at least partially overcome.

SUMMARY OF THE INVENTION

An aspect of the invention relates to an electronic control unit for a vehicle, said electronic control unit comprising a memory region in which is stored a lookup table indicating, depending on a type of alert and on the distance between the vehicle and a traffic event relating to said alert, the need to send a response message to the alert signal, the electronic control unit being configured to:

receive an alert signal relating to a traffic event containing the type of alert and the position of the traffic event, receive the predetermined position of the vehicle, determine the distance between the vehicle and the traffic event based on the position of the traffic event of the received alert signal and on the received predetermined position of the vehicle, determine, based on the lookup table and on the determined distance, whether or not there is a need to send a response message to the alert signal, dispatch a command signal commanding a response message to be sent when it is determined that there is a need to send a response message to the alert signal.

Contrary to what was previously the case, the control unit does not systematically dispatch a response message to the alert signal. More precisely, by virtue of the lookup table, the control unit determines that there is a need to dispatch a response message only for vehicles located nearby the traffic event. Thus, vehicles far from the traffic event do not send a response message. This makes it possible to limit the total number of response messages dispatched, and therefore to limit the number of collisions between the messages dispatched.

In the present case, sending a response message makes it possible to ensure that vehicles nearby the traffic event have correctly received the alert signal.

The invention also relates to a driver-assisting module for a vehicle, said driver-assisting module comprising a communication module and an electronic control unit such as described above, said communication module being able to receive, from a satellite, an alert signal relating to a traffic event containing the type of alert and the position of the traffic event, and to transmit said received alert signal to the electronic control unit, the communication module also being able to transmit a response message to said alert signal, via a satellite or a terrestrial communication network, to a processing center.

The communication module therefore makes it possible to transmit a response message to the alert signal when it is necessary to do so, and especially when the control unit has determined that the vehicle is located nearby the traffic event.

The invention also relates to a method for responding to a signal implemented by an assisting module such as described above, comprising steps of:

receiving an alert signal, receiving the predetermined position of a vehicle, determining the distance between the vehicle and a traffic event based on the position of the traffic event of the received alert signal and on the received predetermined position of the vehicle, determining, based on a lookup table and on the determined distance, whether or not there is a need to send a response message to the alert signal, dispatching, to a communication module, a command signal commanding a response message to be sent when it is determined that there is a need to send a response message to the alert signal.

The responding method thus makes it possible for a response message to be dispatched, to the alert signal, only by vehicles close to the traffic event, and not by those far from the traffic event.

The invention also relates to a computer program product that is noteworthy in that it comprises a set of program code instructions that, when they are executed by one or more processors, configure the one or more processors to implement a method such as described above.

The invention also relates to a vehicle, especially a motor vehicle, comprising an assisting module such as presented above.

The invention also relates to an alerting system comprising a set of vehicles such as described above and a set of satellites in which at least a first satellite is able to receive an alert signal and to send said received alert signal to the set of vehicles.

At least one satellite of the set of satellites therefore allows, by sending an alert signal, information relating to a traffic event to be transmitted to the set of vehicles.

The invention also relates to a method for informing a set of vehicles, the method, which is implemented by a system such as described above, comprising steps of:

sending, to at least a first satellite, an alert signal relating to a traffic event containing the type of alert and the position of the traffic event, the at least a first satellite receiving said sent alert signal, the at least a first satellite sending said received alert signal to a set of vehicles, then, in each vehicle of the set of vehicles:

a communication module receiving the sent alert signal, said communication module then transmitting the received alert signal to the electronic control unit, an electronic control unit receiving the predetermined position of said vehicle, determining the distance between said vehicle and the traffic event based on the position of the traffic event of the received alert signal and on the received predetermined position of the vehicle, determining, based on a lookup table, whether or not there is a need to send a response message to the alert signal, when it is determined that there is a need to send a response message to the alert signal, sending a response message to the alert signal to a processing center.

Preferably, the informing method comprises, after the step of the communication module receiving the alert signal, a step of sending, to the driver of the vehicle, an information message relating to the traffic event.

Thus, the informing method comprises a step of sending a response message to the alert signal, but it is implemented only by vehicles located nearby the traffic event relating to said alert signal. This makes it possible to ensure that all the vehicles located nearby the traffic event have correctly received the alert signal, without however needlessly increasing the number of response messages dispatched. The method also makes it possible to inform, via dispatch of an information message, the driver of each vehicle located nearby the traffic event of the nature and position of the traffic event relating to the signal alert.

Preferably, the step of sending the alert signal of the method to the at least a first satellite is carried out by a vehicle or by a piece of monitoring equipment.

Thus, it is a vehicle or piece of monitoring equipment that detects a traffic event and that dispatches an alert signal, relating to this traffic event, to share information on this subject, especially with other road users.

Also preferably, after the step of the at least a first satellite receiving said sent alert signal, the method comprises a step of the at least a first satellite transmitting said received alert signal to at least a second satellite and of the at least a second satellite sending said received alert signal to a set of vehicles.

Thus, here, the satellites may communicate and transmit an alert signal to one another, especially in order to inform road users more rapidly and in a larger geographical area.

Advantageously, prior to the step of sending the response message to the alert signal to a processing center, the method comprises a step of connecting to a (3G, LTE or 5G) terrestrial communication network, the response message then being dispatched to the processing center via said terrestrial communication network, or, when it was not possible to connect to a terrestrial communication network, the response message being dispatched to the processing center via the at least a first satellite or via the at least a second satellite.

Thus, a response message to the alert signal may be transmitted in various ways.

BRIEF DESCRIPTION OF THE DRAWINGS

Other features and advantages of aspects of the invention will become more apparent upon reading the following description. This description is purely illustrative and should be read with reference to the appended drawings, in which.

DETAILED DESCRIPTION OF THE PREFERRED EMBODIMENTS

One form of embodiment of the alerting system according to the invention will now be described.

The alerting system comprises a set of vehicles and a set of satellites. Communication between each vehicle of the set of vehicles and each satellite of the set of satellites is two-way.

Satellites

Each satellite of the set of satellites is especially an LEO satellite (LEO standing for "low earth orbit"). In particular, an LEO satellite moves at a constant speed, for example 27,000 km/h, in a defined orbit at a constant altitude, for example between 500 km and 1200 km.

At least a first satellite of the set of satellites is configured to receive an alert signal relating to a traffic event, this alert signal containing the type of alert and the position of the traffic event.

The event relating to an alert signal may involve an event among: a traffic jam and/or a slowdown, a collision risk, a hazardous intersection, an accident, roadworks, a vehicle performing emergency braking, a vehicle changing lane, etc.

The alert signal here is a radio-frequency signal.

The alert signal may have been dispatched beforehand by a vehicle or by piece of monitoring equipment, such as for example a toll station, traffic lights, streetlights, emergency telephones on expressways, etc.

The type of alert defines and characterizes the traffic event, and especially indicates the nature of the traffic event. The type of alert may thus be one of the following types: a traffic jam and/or a slowdown, a collision risk, a hazardous intersection, an accident, roadworks, a vehicle performing emergency braking, a vehicle changing lane, etc.

The position of the traffic event is especially defined by a set of geographic coordinates, especially comprising its latitude and longitude.

Figure 1:
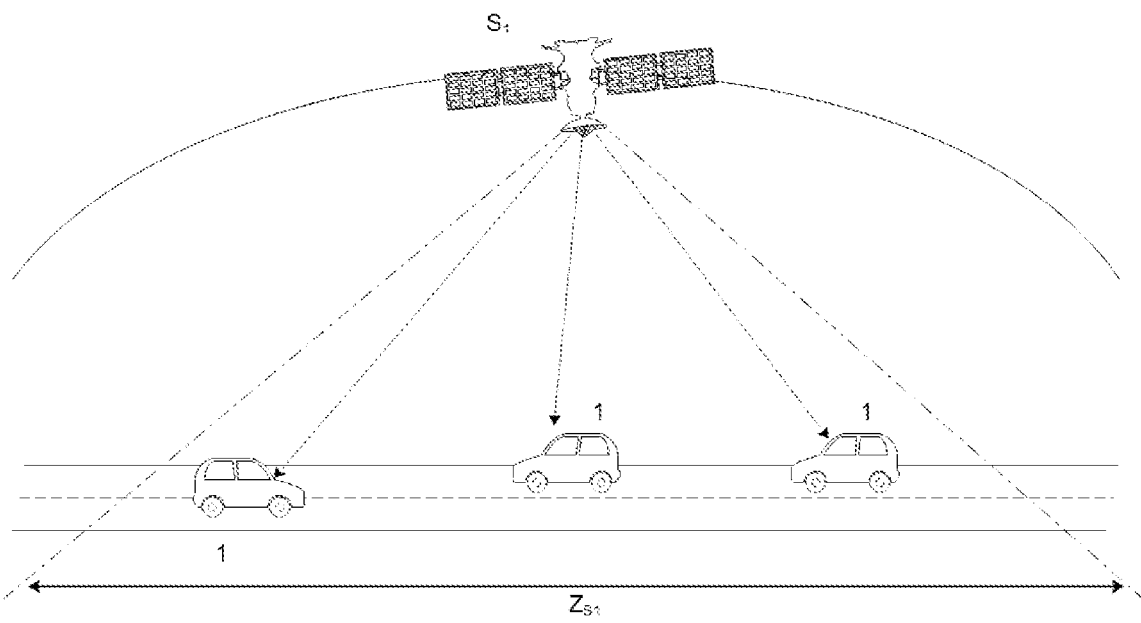
FIG. 1 schematically illustrates a satellite and a set of vehicles of the alerting system according to an aspect of the invention, FIG. 2 schematically illustrates a set of satellites and a set of vehicles of the alerting system according to an aspect of the invention, FIG. 3 schematically illustrates one form of embodiment of a vehicle of the alerting system according to the invention.

In addition, with reference to FIG. 1, the at least a first satellite $S_1$ is configured to send the received alert signal to a set of vehicles 1 present in the region of coverage $Z_{S1}$ of said first satellite $S_1$. The region of coverage of a satellite is the terrestrial area seen by said satellite at any one given time.

Figure 2:
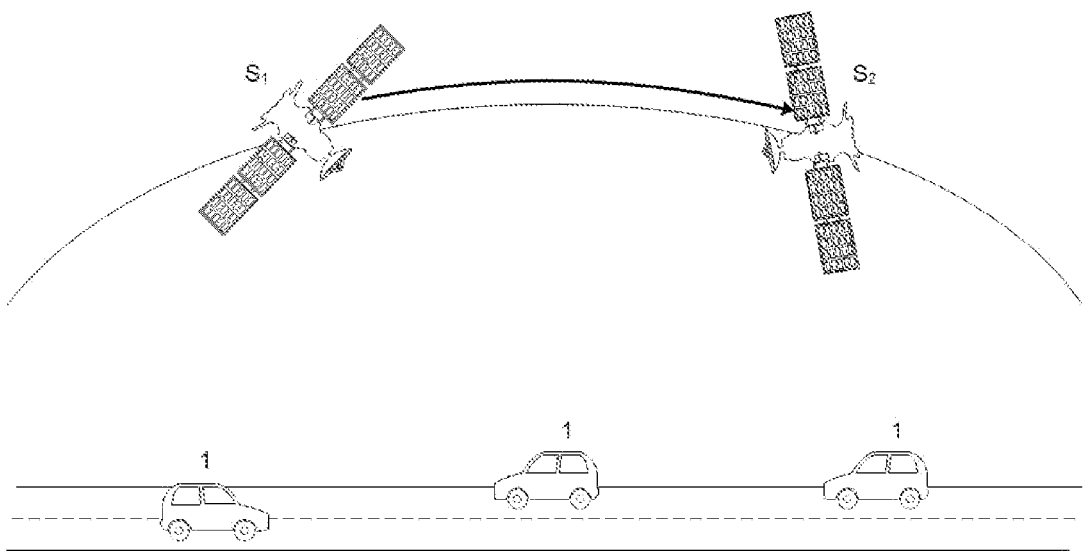

With reference to FIG. 2, the at least a first satellite $S_1$ is also configured to transmit the received alert signal to at least a second satellite $S_2$ of the set of satellites. Thus, similarly to the representation of FIG. 1, the at least a second satellite $S_2$ is also configured to send the received alert signal to a set of vehicles 1 present in the region of coverage of said at least a second satellite $S_2$.

Vehicle 1

Figure 3:
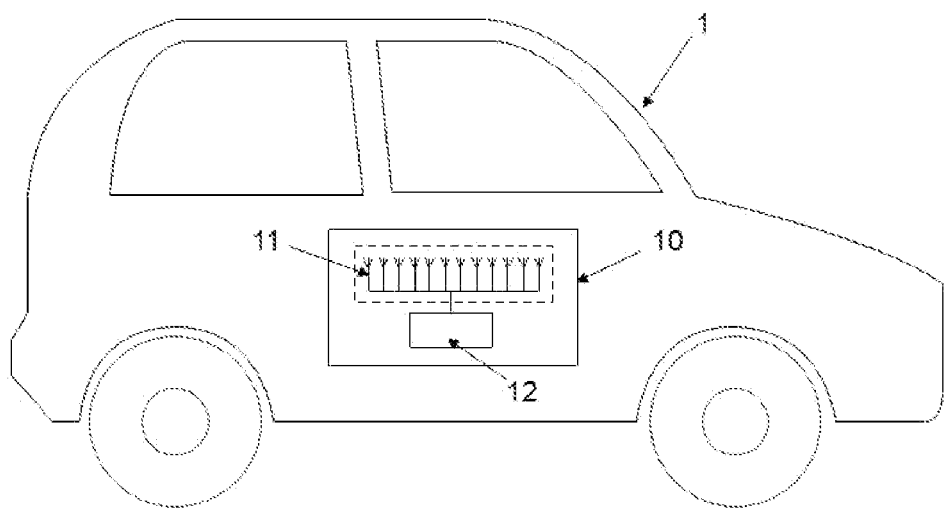

With reference to FIG. 3, each vehicle 1 of the set of vehicles comprises a driver-assisting module 10 and a satellite positioning system.

Assisting Module 10

Each driver-assisting module 10 comprises a communication module 11 and a control unit 12.

Communication Module 11

The communication module 11 comprises at least one antenna, configured to receive and/or transmit at least one, especially radio-frequency, alert signal.

The communication module 11 is also configured to receive a command signal, indicating to the communication module 11 the need to dispatch a response message to the alert signal. More precisely, when the communication module 11 receives a command signal, the communication module 11 is configured to dispatch a response message to a processing center. The expression 'processing center' may refer to any structure that collects information with regard to processing data exchanged by road users, such as a freeway processing center for example. The response message makes it possible to notify the processing center that the alert signal has been correctly received by the assisting module 10 of the vehicle 1.

In addition, the command signal may contain information indicating to the communication module 11 to send the response message immediately after receipt of the command signal.

Moreover, the command signal may contain information indicating to the communication module 11 to send the response message after a predetermined delay. While waiting for the end of the delay, the communication module 11 is especially configured to keep the response message, for example in a queue of messages to be transmitted.

In addition, depending on the command signal received, the communication module 11 is configured to dispatch the response message to the processing center via a terrestrial communication network or via at least one satellite.

More specifically, the expression 'terrestrial communication networks' refers to mobile telephone networks such as 3G and 4G networks, also known to those skilled in the art as "LTE" networks (LTE standing for "long-term evolution"), or 5G networks.

The expression 'at least one satellite' refers to any satellite of the set of satellites or the satellite that dispatched the alert signal.

Electronic Control Unit 12

Memory Region

Figure 4:
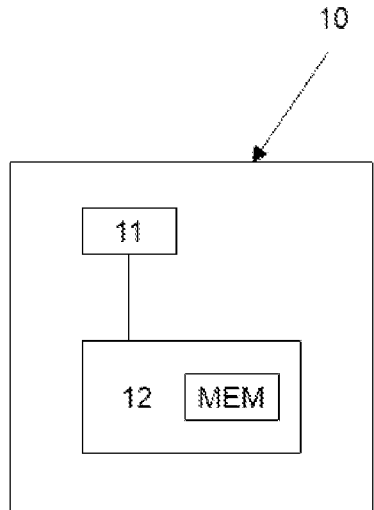
FIG. 4 shows one form of embodiment of a vehicle assisting module according to the invention.

With reference to FIG. 4, the control unit 12 comprises a memory region MEM in which is stored a lookup table indicating, depending on a type of alert and on the distance between the vehicle and a traffic event relating to said alert signal, the need to send a response message to the alert signal.

The response message especially defines a message allowing a processing center to be notified that said alert signal has been correctly received by the control unit 12 of the vehicle 1.

Lookup Table

More precisely, in respect of the lookup table, the expression 'distance between the vehicle 1 and a traffic event' refers to the distance of the path, by road, linking the vehicle 1 and the traffic event.

The lookup table contains a set of i priority levels of the type of alert.

The expression 'set of i levels' especially refers to a scale of priority levels, i designating a natural integer defined between 1 and N, N being a natural integer higher than or equal to 2. For example, the first level 1 is the highest priority level, and is especially given to an accident, major roadworks, etc. The Nth level designates the lowest priority level, and is for example given to information regarding freely flowing traffic.

In a first form of embodiment, each priority level i is associated with the value of a predetermined distance threshold between the vehicle and the traffic event.

In the first form of embodiment, below the distance threshold, a response message to the alert signal must be sent. In other words, when a vehicle 1 having received an alert signal, containing a given type of alert, is located at a distance from the traffic event smaller than the distance threshold, corresponding to the priority level i of the given type of alert, then the vehicle 1 must send a response signal, via the communication module 11.

In a second form of embodiment, each priority level i of the type of alert of the lookup table is associated with a distance interval, defining the set of distances, between the vehicle 1 and the traffic event, for which a response message to the alert signal must be sent. In other words, when a vehicle 1 having received an alert signal, containing a given type of alert, is located at a distance from the traffic event comprised in the distance interval, corresponding to the priority level i of the given type of alert, then the vehicle 1 must send a response signal, via the communication module 11.

In a third form of embodiment, the lookup table comprises a set of rows and a set of columns, each row being identified by a priority level i of the type of alert and each column being identified by a different distance interval. At the intersection of a row and of a column, or in other words for the priority level i identifying said row and for the distance interval identifying said column, information is stored designating whether or not a response message to the alert signal must be sent.

The control unit 12 is configured to receive at least one alert signal via the communication module 11, said alert signal having been dispatched by at least one satellite $S_1$, $S_2$ of the set of satellites.

For each received alert signal, the control unit 12 is also configured to receive the predetermined position of the vehicle 1. To do this, the control unit 12 is connected to the satellite positioning system of the vehicle 1.

More precisely, the position of the vehicle 1 is determined by the satellite positioning system, which is installed in said vehicle 1 beforehand, this type of system commonly being called a GNSS (GNSS standing for "global navigation satellite system")—it is for example a GPS (GPS standing for "global positioning system"). The satellite positioning system is configured to dispatch, to the control unit 12, the predetermined value of the position of the vehicle 1.

The control unit 12 is also configured to determine the distance between the vehicle 1 and the traffic event based on the position of the traffic event of the received alert signal and on the received predetermined position of the vehicle 1. More precisely, the control unit 12 determines the distance separating the geographical coordinates of the traffic event from the received predetermined position of the vehicle 1. Yet more precisely, the term 'distance' refers to the distance of the route to be traveled by the vehicle 1 to reach the position of the traffic event, the route being defined depending on the roads that said vehicle 1 will have to take.

The control unit 12 is also configured to associate the type of alert of the received alert signal with a priority level i of the lookup table. In other words, the control unit 12 is configured to select, from among the set of priority levels i of the lookup table, the level i corresponding to the type of alert contained in the received signal.

In addition, based on the determined distance, on the type of alert contained in the received alert signal and associated with a priority level i, and on the lookup table, the control unit 12 is configured to determine whether or not there is a need to send a response message to the alert signal.

More precisely, according to the first form of embodiment of the lookup table, the control unit 12 is configured to compare the determined distance with the distance threshold, of the lookup table, associated with the level i associated with the type of alert contained in the received alert signal. When the determined distance is smaller than the distance threshold, then the vehicle 1 is located at a distance from the traffic event smaller than the distance threshold, and the control unit 12 is configured to determine that there is a need to send a response message to the alert signal.

According to the second form of embodiment of the lookup table, the control unit 12 is configured to compare the determined distance and the distance interval, of the lookup table, associated with the priority level i associated with the type of alert contained in the received alert signal. When the determined distance is comprised in said distance interval, then the control unit 12 is configured to determine that there is a need to send a response message to the alert signal.

According to the third form of embodiment of the lookup table, the control unit 12 is configured, in the row identified by the level i associated with the type of alert contained in the received alert signal, to determine to which column, or in other words to which distance interval, the determined distance belongs. The control unit 12 determines whether or not there is a need to send a response message to the alert signal depending on the information stored at the intersection between said row and said determined column.

Moreover, the control unit 12 may be configured to determine that it is not necessary to send a response message, when the defined position of a traffic event is not on the path that the vehicle 1 is planning to take.

When it is determined that there is a need to send a response message to the alert signal, or in other words when the vehicle 1 is located in the region for which a response message is required, the control unit 12 is configured to dispatch, to the communication module 11, a command signal commanding the latter to send a response message to the alert signal. The response message may be sent immediately or later on.

Thus, the control unit 12 is configured to determine whether the response message must be dispatched immediately or later on.

For example, when the alert signal is associated with a priority level i among a set of high priority levels i relating to the predefined response message, and/or when the distance between the vehicle 1 and the traffic event is smaller than a predefined distance called the "safety" distance, then the control unit 12 is configured to determine that the response message must be dispatched immediately after the time when it was determined that there was a need to send a response message.

The set of high priority levels i relating to the response message may be predefined by the manufacturer and stored in the memory region MEM of the control unit 12.

According to the first form of embodiment of the lookup table, the safety distance is smaller than the distance threshold associated with the level i associated with the type of alert contained in the received alert signal. According to the second form of embodiment of the lookup table, the safety distance is comprised in the distance interval, of the lookup table, associated with the priority level i associated with the type of alert contained in the received alert signal. According to the third form of embodiment of the lookup table, the safety distance is comprised in at least one distance interval associated with the priority level i associated with the type of alert contained in the received alert signal. For example, the safety distance is preset to two kilometers.

When the response message must be dispatched immediately, then the command signal contains information indicating, to the communication module 11, that the response message must be sent immediately, after receipt of the command signal.

In contrast, when the alert signal is associated with a priority level i among a set of low priority levels i relating to the predefined response message, and/or when the distance between the vehicle 1 and the traffic event is larger than the predefined safety distance, then the control unit 12 is configured to determine that the response message may be sent later on with respect to the time when it was determined that there was a need to send a response message.

The set of low priority levels i relating to the response message may be predefined by the manufacturer and stored in the memory region MEM of the control unit 12.

In addition, the control unit 12 may be configured to determine that the response message may be sent later on when the communication module 11 cannot transmit the response message immediately after receipt of the command signal. This is especially the case when the communication module 11 is busy, or in other words it is already transmitting one or more messages, and/or when the quality of the communication link between the communication module 11 and the recipient of the response message is poor, which is especially the case when the vehicle 1 is moving through a tunnel or is in an underground parking lot.

When the response message may be transmitted later on, the control unit 12 is especially configured to determine the delay, with respect to the time when it was determined that there was a need to send a response message, after which the response may be dispatched.

The delay may correspond to a time delay, especially defining the time it will take for vehicle 1 to move from its position and to arrive at a distance from the traffic event equal to the safety distance. In the present case, the delay may be of the order of a few seconds or of a few minutes.

The delay may also correspond to the distance that vehicle 1 must travel to reach a distance from the traffic event equal to the safety distance.

According to a first form of embodiment of the control unit 12, when the response message may be dispatched with a delay, the control unit 12 waits until the end of the delay to transmit the command signal to the communication module 11. While waiting for the delay to elapse, the control unit 12 is configured to store the command signal in the memory region MEM or to keep the command signal in a queue of messages to be sent and/or transmitted. In the present case, the command signal indicates to the communication module 11 that the response message may be sent immediately after receipt of the command signal.

According to a second form of embodiment of the control unit 12, when the response message may be dispatched with a delay, the control unit 12 is configured to immediately transmit the command signal to the communication module 11. In the present case, the command signal contains information indicating to the communication module 11 the delay after which the communication module 11 may send the response message after receipt of the command signal.

Moreover, in order to know via which means of communication the response message must be transmitted, the control unit 12 is configured to determine the availability of a terrestrial communication network around the vehicle 1.

When a terrestrial communication network is available, the control unit 12 is configured to connect the assisting module 10 to said available terrestrial communication network. In addition, in the present case, the command signal dispatched by the control unit 12 contains information indicating to the communication module 11 that it must send a response message to the alert signal via the terrestrial communication network to which the assisting module 10 is connected.

If no terrestrial communication network is available, the command signal dispatched by the control unit 12 contains information indicating to the communication module 11 that it must send a response message to the alert signal via the at least one satellite of the set of satellites. In other words, the response message may be dispatched via the satellite that dispatched the alert signal or via another satellite of the set of satellites.

In addition, the control unit 12 is configured to send, to the driver of the vehicle 1, an information message relating to the traffic event. The control unit 12 may be configured to send an information message to the driver, whether or not it is necessary to send a response message.

The information message is for example a message displayed on the driver's GPS navigator, indicating to him the location and nature of the traffic event and/or an audio signal. The information message therefore assists the driver with driving.

The information message may also allow certain functions of the vehicle to be activated.

For example, the information message makes it possible to activate emission of an audio alert in the vehicle 1, or to make the driver's seat or the steering wheel vibrate, or to make said vehicle 1 perform emergency braking.

The information message may be sent immediately or later on.

In particular, the control unit 12 is configured to determine whether the information message must be dispatched immediately or later on, especially with respect to receipt of the alert signal.

For example, when the alert signal is associated with a priority level i among a set of high priority levels i relating to the predefined information message, or when the distance between the vehicle 1 and the traffic event is smaller than the safety distance, then the control unit 12 is configured to determine that the information message must be dispatched immediately.

The set of high priority levels i relating to the information message may be predefined by the manufacturer and stored in the memory region MEM of the control unit 12.

In contrast, when the alert signal is associated with a priority level i among a set of low priority levels i relating to the predefined information message, or when the distance between the vehicle 1 and the traffic event is larger than the safety distance, then the control unit 12 is configured to determine that the information message may be sent later on.

The set of low priority levels i relating to the information message may be predefined by the manufacturer and stored in the memory region MEM of the control unit 12.

In addition, the control unit 12 is configured to determine that the information message may be dispatched later on when the means of communication allowing the information message to be sent to the driver is busy at the time of the request to send the information message, especially because it is already sending messages.

When the information message may be sent later on, the control unit 12 is especially configured to determine the delay after which the information message may be dispatched, especially with respect to receipt of the alert signal.

The delay may correspond to a time delay, especially defining the time it will take for vehicle 1 to move from its position and to arrive at a distance from the traffic event equal to the safety distance. In the present case, the delay may be of the order of a few seconds or of a few minutes.

The delay may also correspond to the distance that vehicle 1 must travel to reach a distance from the traffic event equal to the safety distance.

In addition, while waiting for the delay to elapse, the control unit 12 is configured to store the information message in the memory region MEM or in a queue of messages to be transmitted.

Thus, the driver of the vehicle 1 is warned of the presence of the traffic event when vehicle 1 is nearby said traffic event. The driver of the vehicle 1 is therefore warned at the appropriate time of said traffic event.

The control unit 12 comprises a processor capable of implementing a set of instructions for performing these functions.

Thus, the control unit 12 determines that each vehicle 1 of the alerting system that received an alert signal and that is located in immediate proximity to the traffic event needs to dispatch a response message to the alert signal. Thus, the processing center knows whether each of said vehicles 1 in immediate proximity to the traffic event has correctly received the alert signal. This therefore makes it possible to determine whether the driver of each of these vehicles 1 has been informed of the traffic event relating to the alert signal.

Moreover, whether or not a response message is dispatched, the control unit 12 also allows, via dispatch of an information message, the driver of each vehicle 1, whether far from or nearby the traffic event, to be warned of the presence of a traffic event.

Implementation

Figure 5:
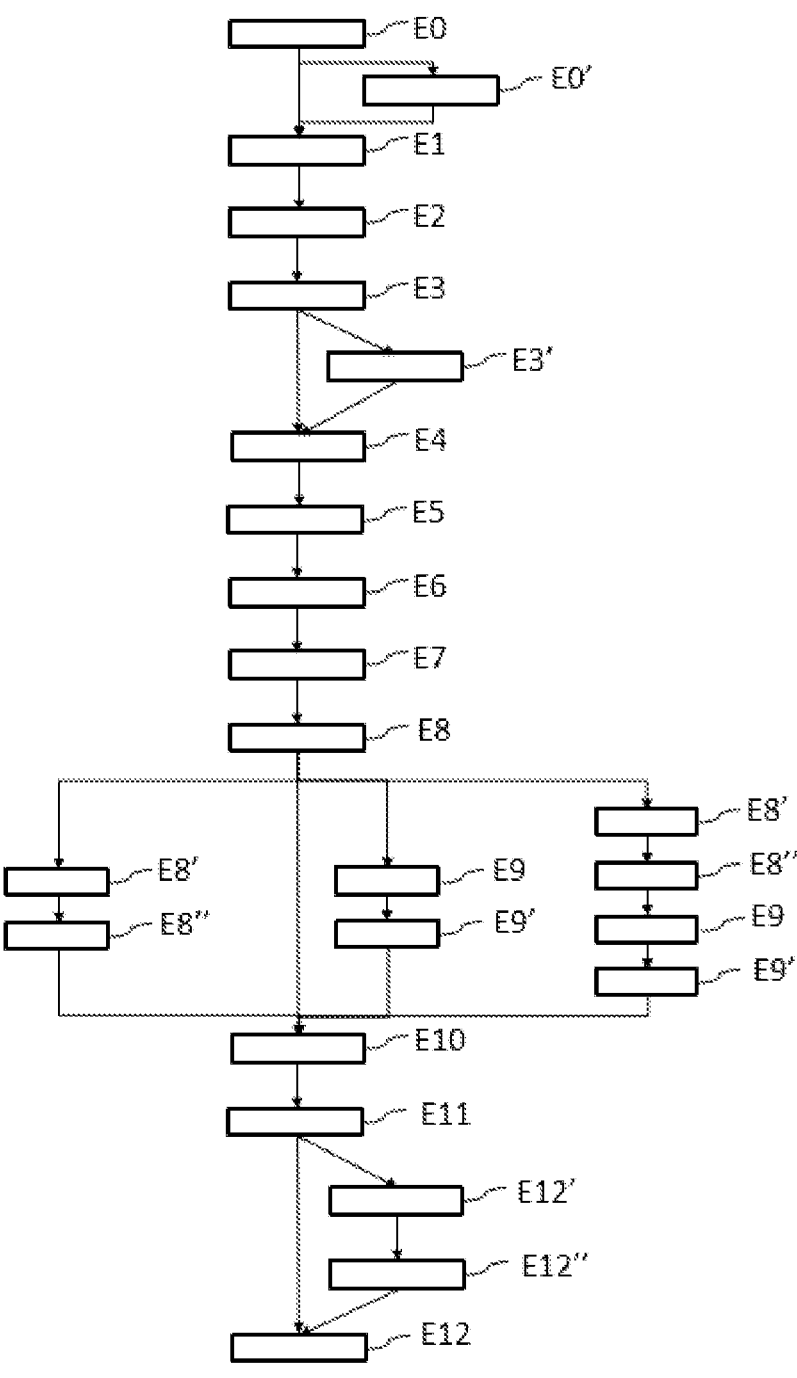
FIG. 5 illustrates one embodiment of the method according to the invention.

With reference to FIG. 5, one embodiment of the method according to the invention, implemented by the alerting system such as described above, will now be presented.

The method firstly comprises a step E0 of detecting a notable traffic event, especially one potentially representing a hazard. Said traffic event may have been detected by a vehicle 1 of the alerting system or by a piece of monitoring equipment, such as a toll station for example.

The method may also comprise, after the step E0 of detecting a traffic event, a first step E0' of transmitting an alert signal, in which step the vehicle 1 or piece of monitoring equipment that detected said traffic event transmits an alert signal, relating to the detected traffic event and containing the type of alert and the position of the detected traffic event, to another vehicle 1 and/or to another piece of monitoring equipment.

The method then comprises a step E1 of sending, to at least a first satellite $S_1$ of the alert system, an alert signal relating to the detecting traffic event containing the type of alert and the position of the detected traffic event. The alert signal may be sent by the element that previously detected the traffic event, which is especially a vehicle 1 or a piece of monitoring equipment.

The alert signal may also have been sent by another vehicle 1 or another piece of monitoring equipment having received an alert signal.

The method then comprises a step E2 of the at least a first satellite $S_1$ receiving said sent alert signal.

The method then comprises a step E3 of the at least a first satellite $S_1$ sending said received alert signal to the set of vehicles 1 present in the region of coverage $Z_{s1}$ of said first satellite $S_1$.

The method may also comprise, after the receiving step E2 or after the sending step E3, a step E3' of the at least a first satellite $S_1$ transmitting said received alert signal to at least a second satellite $S_2$. In addition, following the step E3' of transmitting an alert signal, the method comprises a step of the at least a second satellite $S_2$ sending said received alert signal to the set of vehicles 1 present in the region of coverage of the at least a second satellite $S_2$.

For each vehicle 1 present in region of coverage $Z_{S1}$ of the at least a first satellite $S_1$ or of the at least a second satellite $S_2$ and that sent the alert signal, the method comprises a step E4 of the communication module 11 of said vehicle 1 receiving the sent alert signal. In addition, the alert signal received by the communication module 11 is transmitted by said communication module 11 to the electronic control unit 12.

In each vehicle 1, after the control unit 12 has received the alert signal, the method comprises a step E5 of the control unit 12 receiving the predetermined position of the vehicle 1. The position of the vehicle 1 is especially determined and dispatched by a satellite positioning system.

Following receipt of the predetermined position of the vehicle 1, the method comprises a step E6 of the control unit 12 determining the distance between said vehicle 1 and the traffic event based on the position of the traffic event (contained in the received alert signal) and on the received predetermined position of the vehicle 1.

After the step E4 of receiving the alert signal or after the step E6 of determining the distance, the method comprises a step E7 of associating the type of alert (contained in the received alert signal) with a priority level i of the lookup table.

Following the associating step E7 and the distance-determining step E6, the method comprises a step E8 of determining whether or not there is a need to send a response message to the alert signal.

In a first embodiment, the determining step E8 is implemented based on the first form of embodiment of the lookup table. In particular, in the determining step E8, the control unit 12 compares the determined distance with the distance threshold, of the lookup table, associated with the level i associated with the type of alert contained in the received alert signal. The control unit 12 determines that there is a need to send a response message when the determined distance is smaller than said distance threshold.

In a first embodiment, the determining step E8 is implemented based on the second form of embodiment of the lookup table. In particular, in the determining step E8, the control unit 12 compares the determined distance and the distance interval, of the lookup table, associated with the level i associated with the type of alert contained in the received alert signal. The control unit 12 determines that there is a need to send a response message when the determined distance is comprised in said distance interval.

In a third embodiment, the determining step E8 is implemented based on the third form of embodiment of the lookup table. In particular, in the determining step E8, in the row identified by the level i associated with the type of alert, the control unit 12 determines to which column, or in other words to which distance interval, the determined distance belongs. The control unit 12 determines whether or not there is a need to send a response message to the alert signal depending on the information stored at the intersection between said row and said determined column.

Following determination of the need to send a response message to the alert signal, the method comprises a step E8' of determining whether the response message must be sent immediately or later on, with respect to the time when it was determined that there was a need to send a response message.

For example, when the alert signal is associated with a priority level i among a set of high priority levels i relating to the predefined response message, or when the distance between the vehicle 1 and the traffic event is smaller than the safety distance, then the control unit 12 determines that the response message must be dispatched immediately after the time when it was determined that there was a need to send a response message.

In contrast, when the alert signal is associated with a priority level i among a set of low priority levels i relating to the predefined response message, or when the distance between the vehicle 1 and the traffic event is larger than the safety distance, then the control unit 12 determines that the response message may be sent later on with respect to the time when it was determined that there was a need to send a response message.

When the response message may be sent later on, the method comprises a delay-determining step E8'', in which step the control unit 12 determines the delay, from the time when it was determined that there was a need to send a response message, after which the response message may be dispatched.

In addition, when it is determined that there is a need to send a response message to the alert signal, or following the delay-determining step E8'', the method may comprise a step E9 of determining the availability of a terrestrial communication network.

When a terrestrial communication network is available, the method comprises a step E9' of connecting the assisting module 10, and especially the communication module 11, to the available terrestrial communication network.

Following determination of the need to send a response message, or after the delay-determining step E8'', or after the connecting step E9', the method comprises a step E10 of the control unit 12 sending a command signal to the communication module 11, this command signal commanding the latter to send a response message to the alert signal.

In the first form of embodiment of the control unit 12, when the response message may be sent after the determined delay, the control unit 12 waits until the end of the determined delay to transmit the command signal to the communication module 11. While waiting for the delay to elapse, the method comprises a step of the control unit 12 storing the command signal in the memory region MEM or in a queue of messages to be sent and/or transmitted. In the present case, the command signal indicates to the communication module 11 that the response message may be sent immediately after receipt of the command signal.

According to a second form of embodiment of the control unit 12, when the response message may be dispatched after the determined delay, the control unit 12 immediately transmits the command signal to the communication module 11. In the present case, the command signal comprises information indicating to the communication module 11 the determined delay, after receipt of the command signal, after which the communication module 11 may send the response message.

In contrast, when the response message may be dispatched without delay, then the command signal, sent immediately by the control unit 12, contains information indicating to the communication module 11 that it must immediately send the response message, after receipt of the command signal.

Moreover, when a terrestrial communication network is available, the command signal dispatched to the communication module 11 contains information indicating to the communication module 11 that it must send a response message to the alert signal via the terrestrial communication network to which the assisting module 10 is connected.

Otherwise, the command signal dispatched to the communication module 11 contains information indicating to the communication module 11 that it must send a response message to the alert signal via the at least one satellite $S_1$, $S_2$ of the set of satellites.

After receipt by the communication module 11 of the command signal sent, the method comprises a step E11 of the communication module 11 sending a response message to a processing center. The response message is sent depending on indications contained in the command signal.

For example, when the command signal indicates to the communication module 11 that the response message may be sent immediately after receipt of the command signal, the communication module 11 immediately sends the response message.

Moreover, when the command signal contains information indicating to the communication module 11 the determined delay, after which the response message must be sent, the method comprises a step of the communication module 11 storing the response message, while waiting until the end of the determined delay to send the response message.

In particular, when the assisting module 10 is connected to a terrestrial communication network, the response message is sent via said terrestrial communication network. Otherwise, the response message is transmitted to the processing center via the at least one satellite, and especially via the at least a first satellite $S_1$ or the at least a second satellite $S_2$.

After the step of the control unit 12 receiving the alert signal, or simultaneously with or after the step E11 of sending a response message, the method comprises a step E12 of sending, to the driver of the vehicle 1, an information message relating to the traffic event. The information message may be sent immediately or after a delay. Thus, the driver is informed of the nature and position of the traffic event.

In particular, prior to the sending step E12, the method comprises a step E12' of determining whether the information message must be dispatched immediately or later on, with respect to the time when the alert signal was received by the control unit 12.

For example, when the alert signal is associated with a priority level i among a set of high priority levels i relating to the predefined information message, or when the distance between the vehicle 1 and the traffic event is smaller than the safety distance, then the control unit 12 determines that the information message must be dispatched immediately.

In contrast, when the alert signal is associated with a priority level i among a set of low priority levels i relating to the predefined information message, or when the distance between the vehicle 1 and the traffic event is larger than the safety distance, then the control unit 12 determines that the information message may be sent later on.

Moreover, the control unit 12 determines that the information message may be dispatched later on when the means of communication allowing the information message to be sent to the driver is busy at the time of the request to send the information message, especially because it is already sending messages.

When the response message may be sent later on, the method comprises a sub-step E12'' of the control unit 12 determining the delay after which the information message may be dispatched. The delay may correspond to a time delay or to a distance.

In addition, while waiting for the delay to elapse, the method includes a step of the control unit 12 storing the information message.

When the method comprises a sub-step E12' of determining whether an information message must be dispatched later on and a delay-determining sub-step E12'', the step E12 of sending an information message is carried out after said two mentioned steps.

Thus, during the implementation of the method, a response message to the alert signal is dispatched by the vehicles 1 of the alerting system that received an alert signal and that are located in immediate proximity to the traffic event. Thus, the processing center knows whether said vehicles 1 have all correctly received the alert signal. This therefore makes it possible to determine whether the driver of each of these vehicles 1 has been informed of the traffic event relating to the alert signal.

The method makes it possible to prevent a response message to the alert signal from being dispatched by vehicles 1 that received an alert signal but that are relatively far from the traffic event. This makes it possible to avoid dispatching a relatively high number of response messages.

Moreover, whether or not a response message is dispatched, the method according to an aspect of the invention also allows the driver of each vehicle 1, whether far from or nearby the traffic event, to be warned of the presence of a traffic event.

The invention claimed is:

1. An electronic control unit for a vehicle, said electronic control unit comprising a memory region in which is stored a lookup table including data entries associating integer values with distance values, each integer value representing a type of alert and each distance value representing a distance along roads, wherein the lookup table is used by the electronic control unit to indicate a need to send a response message to an alert signal, the electronic control unit being configured to:

receive the alert signal relating to a traffic event containing an integer value indicating the type of alert and geographic coordinates including a latitude and a longitude indicating a position of the traffic event, receive Global Positioning System (GPS) coordinates indicating a predetermined position of the vehicle, determine the distance between the vehicle and the traffic event as a distance of a route along roads from the GPS coordinates indicating the predetermined position of the vehicle to the geographic coordinates indicating the position of the traffic event, determine whether or not there is a need to send the response message immediately in response to the alert signal, the response message acknowledging receipt of the alert signal, the determining whether or not there is the need comprising:

associating the alert signal with a priority level among a set of priority levels stored in the lookup table, determining that there that there is a need to immediately send the response message when (i) the priority level is a high priority level or (ii) the distance between the vehicle and the traffic event is smaller than a predefined safety distance, and determining that there is a need to send the response message later on when (i) the priority level is not a high priority level and (ii) the distance between the vehicle and the traffic event is larger than the predefined safety distance;

determine a time delay for dispatching the response message to be sent over a communication network in response to determining that there is the need to send the response message, dispatch a command signal to a communication module commanding the response message to be sent over the communication network when the time delay elapses, wherein the response message is stored in the memory region until the time delay elapses, dispatch a command signal to the communication module commanding the response message to be sent over the communication network in response to determining that there is the need to immediately send the response message, and generate an information message to cause a component of the vehicle to vibrate to alert a driver of the vehicle of the traffic event.

2. A driver-assisting module for a vehicle, said driver-assisting module comprising a communication module and an electronic control unit as claimed in claim 1, said communication module being able to receive, from a satellite, an alert signal relating to a traffic event containing the type of alert and the position of the traffic event, and to transmit said received alert signal to the electronic control unit, the communication module also being able to send a response message to said alert signal, via a satellite or a terrestrial communication network, to a processing center.

3. A vehicle, especially a motor vehicle, comprising the driver-assisting module as claimed in claim 2.

4. An alerting system comprising a set of vehicles as claimed in claim 3 and a set of satellites in which at least a first satellite is able to receive an alert signal and to send said received alert signal to the set of vehicles.

5. A method for informing a set of vehicles, the method, which is implemented by a system as claimed in claim 4, comprising:

sending, to at least a first satellite, an alert signal relating to a traffic event containing the type of alert and the position of the traffic event, the at least a first satellite receiving said sent alert signal, the at least a first satellite sending said received alert signal to a set of vehicles, then, in each vehicle of the set of vehicles:

a communication module receiving the sent alert signal, said communication module then transmitting the received alert signal to an electronic control unit, the electronic control unit receiving the predetermined position of said vehicle, determining the distance between said vehicle and the traffic event based on the position of the traffic event of the received alert signal and on the received predetermined position of the vehicle, determining, based on a lookup table, whether or not there is a need to send a response message to the alert signal, when it is determined that there is a need to send a response message to the alert signal, sending a response message to the alert signal to a processing center.

6. The informing method as claimed in claim 5, comprising, after the step of the communication module receiving the alert signal, a step of sending, to the driver of the vehicle, an information message relating to the traffic event.

7. The method as claimed in claim 5, comprising, after the step of the at least a first satellite receiving said sent alert signal, a step of the at least a first satellite transmitting said received alert signal to at least a second satellite and of the at least a second satellite sending said received alert signal to a set of vehicles.

8. The method as claimed in claim 7, comprising, prior to the step of sending the response message to the alert signal to a processing center, a step of connecting to a terrestrial communication network, the response message then being dispatched to the processing center via said terrestrial communication network, or, when it was not possible to connect to a terrestrial communication network, the response message being dispatched to the processing center via the at least a first satellite or, via the at least a first satellite or the at least a second satellite.

9. The method as claimed in claim 5, comprising, prior to the step of sending the response message to the alert signal to a processing center, a step of connecting to a terrestrial communication network, the response message then being dispatched to the processing center via said terrestrial communication network, or, when it was not possible to connect to a terrestrial communication network, the response message being dispatched to the processing center via the at least a first satellite.

10. A method for responding to an alert signal implemented by a driver-assisting module, the method comprising:

receiving an alert signal relating to a traffic event containing an integer value indicating the type of alert and geographic coordinates including a latitude and a longitude indicating a position of the traffic event, receiving Global Positioning System (GPS) coordinates indicating a predetermined position of a vehicle, determining the distance between the vehicle and a traffic event as a distance of a route along roads from the GPS coordinates indicating the predetermined position of the vehicle to the geographic coordinates indicating the position of the traffic event, determining, based on a lookup table and on the determined distance, whether or not there is a need to send a response message immediately in response to the alert signal, the response message acknowledging receipt of the alert signal, the determining whether or not there is the need comprising:

associating the alert signal with a priority level among a set of priority levels stored in the lookup table, determining that there that there is a need to immediately send the response message when (i) the priority level is a high priority level or (ii) the distance between the vehicle and the traffic event is smaller than a predefined safety distance, and determining that there is a need to send the response message later on when (i) the priority level is not a high priority level and (ii) the distance between the vehicle and the traffic event is larger than the predefined safety distance;

determining a time delay for dispatching the response message to be sent over a communication network in response to determining that there is the need to send the response message later on;

dispatching a command signal to a communication module commanding the response message to be sent over the communication network when the time delay elapses, wherein the response message is stored in the memory region until the time delay elapses;

dispatching, to a communication module, a command signal commanding a response message to be sent in response to determining that there is a need to immediately send a response message to the alert signal; and generate an information message to cause a component of the vehicle to vibrate to alert a driver of the vehicle of the traffic event.

11. A computer program product, comprising a set of program code instructions that, when they are executed by one or more processors, configure the one or more processors to implement a method as claimed in claim 3.

* * * * *